(12) United States Patent
Wood

(10) Patent No.: US 8,398,027 B2
(45) Date of Patent: Mar. 19, 2013

(54) METHOD AND APPARATUS FOR REINFORCING COMPOSITE STRUCTURES

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 1178 days.

(21) Appl. No.: 11/856,271

(22) Filed: Sep. 17, 2007

(65) Prior Publication Data

US 2010/0065688 A1     Mar. 18, 2010

(51) Int. Cl.
B64C 1/00     (2006.01)
(52) U.S. Cl. .................. 244/131; 244/119; 403/267
(58) Field of Classification Search .......... 244/131, 244/1 R, 117 R, 119, 120, 123.1, 129.1, 132; 411/258, 378, 427, 429; 403/267, 270
See application file for complete search history.

(56) References Cited

U.S. PATENT DOCUMENTS

| | | | | |
|---|---|---|---|---|
| 2,787,185 A * | 4/1957 | Rea et al. | ................... | 411/49 |
| 4,033,222 A * | 7/1977 | Wilson | ................... | 411/33 |
| 4,502,092 A * | 2/1985 | Bannink et al. | ................... | 361/218 |
| 4,556,591 A * | 12/1985 | Bannink, Jr. | ................... | 428/43 |
| 4,659,268 A * | 4/1987 | Del Mundo et al. | ................... | 411/34 |
| 4,717,302 A | 1/1988 | Adams et al. | | |
| 4,863,330 A * | 9/1989 | Olez et al. | ................... | 411/424 |
| 5,082,405 A * | 1/1992 | Witten | ................... | 411/82 |
| 5,098,240 A | 3/1992 | Gapp et al. | | |
| 5,275,529 A * | 1/1994 | Langenbrunner et al. | .... | 415/119 |
| 5,314,282 A * | 5/1994 | Murphy et al. | ................... | 411/426 |
| 5,350,264 A * | 9/1994 | Stencel | ................... | 411/55 |
| 5,399,052 A | 3/1995 | Volkmann et al. | | |
| 5,431,518 A * | 7/1995 | Young et al. | ................... | 411/429 |
| 5,672,036 A * | 9/1997 | Medal | ................... | 411/82 |
| 5,709,356 A * | 1/1998 | Avenet et al. | ................... | 244/1 A |
| 5,845,872 A * | 12/1998 | Pridham et al. | ................... | 244/1 A |
| 6,537,006 B1 * | 3/2003 | Clark | ................... | 411/82 |
| 7,150,594 B2 | 12/2006 | Keener | | |
| 7,204,667 B2 * | 4/2007 | Uno et al. | ................... | 411/338 |
| 7,686,905 B2 * | 3/2010 | Ackerman et al. | ................... | 156/94 |
| 7,886,439 B2 * | 2/2011 | Braden et al. | ................... | 29/854 |
| 2006/0243860 A1 | 11/2006 | Kismarton | | |
| 2008/0258008 A1 * | 10/2008 | Cooper | ................... | 244/131 |
| 2009/0047100 A1 * | 2/2009 | Keener | ................... | 411/501 |
| 2010/0001137 A1 * | 1/2010 | Keener | ................... | 244/131 |
| 2010/0038489 A1 * | 2/2010 | Bense et al. | ................... | 244/131 |
| 2010/0044514 A1 * | 2/2010 | Tacke | ................... | 244/131 |

FOREIGN PATENT DOCUMENTS

| | | | |
|---|---|---|---|
| EP | 0373642 A | 6/1990 | |
| WO | 9111633 A | 8/1991 | |

OTHER PUBLICATIONS

Campbell, "Manufacturing processes for advanced composites", 2004, Elsevier, Oxford UK, pp. 296-297.

* cited by examiner

Primary Examiner — Benjamin P Lee
(74) Attorney, Agent, or Firm — Yee & Associates, P.C.

(57) ABSTRACT

A computer implemented method and apparatus for creating a structural joint for an aircraft. A first composite component and a second composite component are co-joined to form the structural joint for the aircraft. A hole through the first composite component and the second composite component is created. A composite shear pin is placed through the hole. A composite collar is bonded to the composite shear pin with an adhesive.

20 Claims, 6 Drawing Sheets

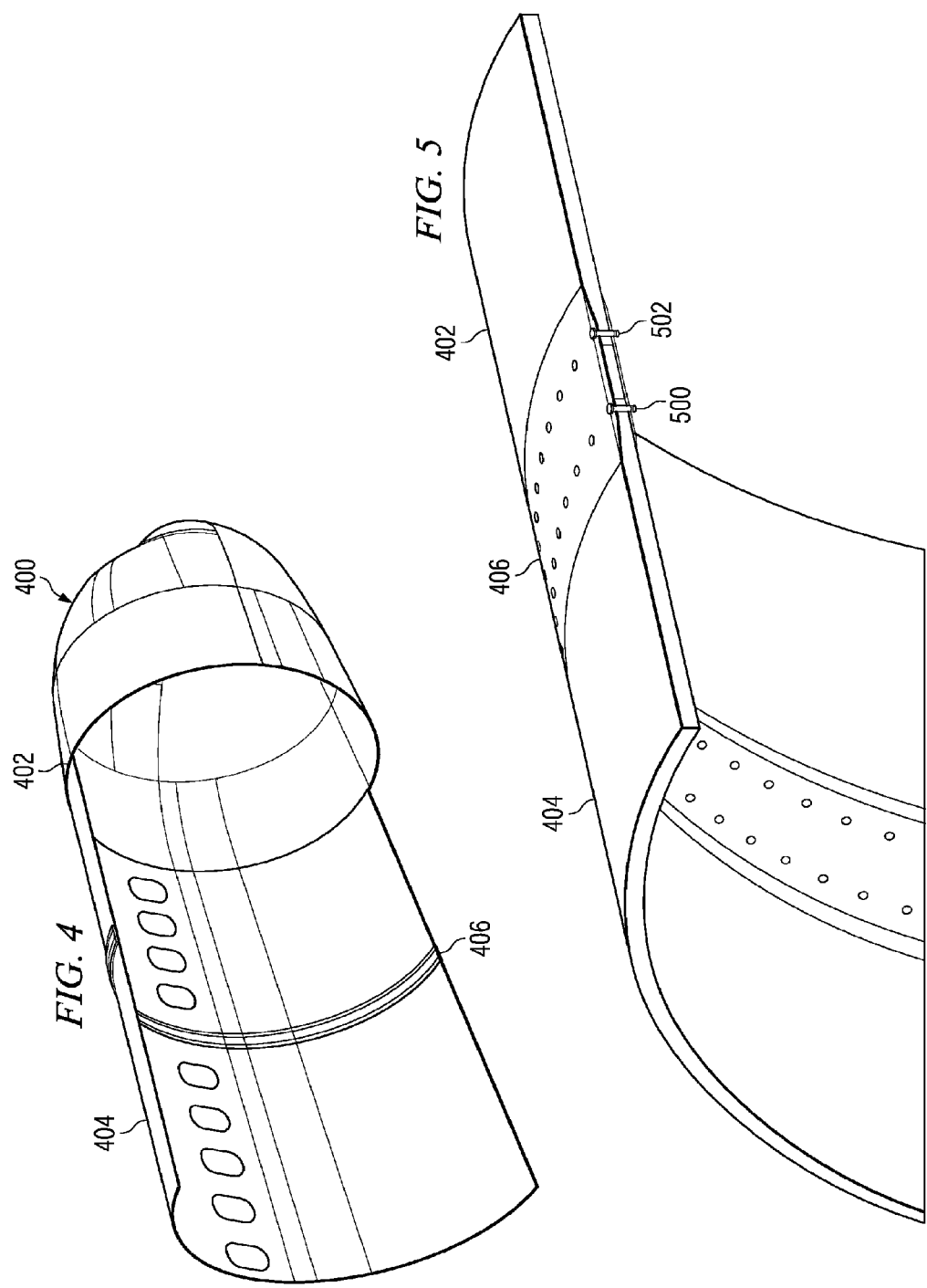

METHOD AND APPARATUS FOR REINFORCING COMPOSITE STRUCTURES

BACKGROUND INFORMATION

1. Field

The present disclosure relates generally to composite components and in particular to a method and apparatus for manufacturing a composite structure. Still more particularly, the present disclosure relates to a method and apparatus for reinforcing a composite structural joint in an aircraft.

2. Background

Aircraft are being designed and manufactured with greater and greater percentages of composite materials. Some aircraft may have more than fifty percent of its primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials, created by combining two or more dissimilar components. For example, a composite may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples include wing sections joined to form a wing, or stabilizer sections joined to form a stabilizer.

With the increased development and use of composite materials for fabricating structures for aircraft, an increasing demand has occurred to depart from metallic components coupled with composites. This demand is present to reduce weight and limit the coefficient of thermal expansion differentials between metallic components and composites. Further, increased maintenance may be needed because of metallic components.

SUMMARY

The advantageous embodiments of the present disclosure provide a computer implemented method and apparatus for creating a structural joint for an aircraft. A first composite component and a second composite component are co-joined to form the structural joint for the aircraft. A hole through the first composite component and the second composite component is created. A composite shear pin is placed through the hole. A composite collar is bonded to the composite shear pin with an adhesive.

In another advantageous embodiment, a method identifies co-joining a first composite component and a second composite component. A channel is formed through the first composite component and the second composite component. A composite fastener system is co-joined in the channel.

In yet another advantageous embodiment, a joint comprises a first composite component, a second composite component, a pin, a collar, and an adhesive. The second composite component is co-joined to the first composite component, wherein a channel through the first composite component and the second composite component is present. A pin has a first end configured to prevent the first end from passing through the channel and a second end having a first mechanical feature. The collar has a second mechanical feature. The adhesive is located between the first mechanical feature of the pin and the second mechanical feature of the collar, wherein the adhesive bonds the pin to the collar.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 4 is a diagram illustrating a structure in which a fastener system may be implemented in accordance with an advantageous embodiment;

FIG. 5 is a cross-sectional view of a fuselage in accordance with an advantageous embodiment;

DETAILED DESCRIPTION

Figure 1:
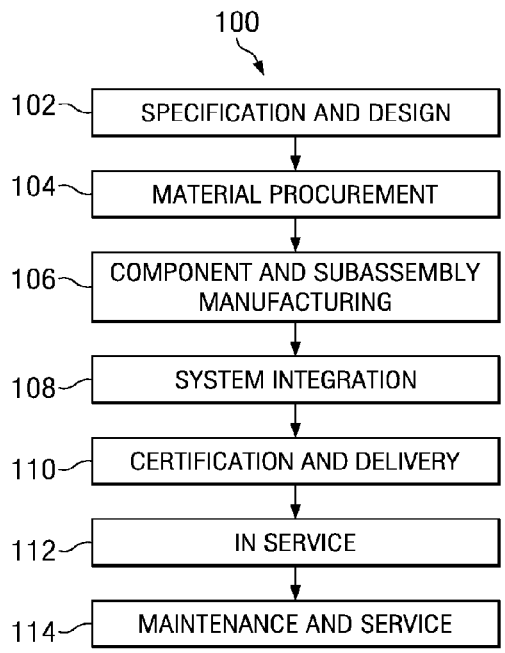
FIG. 1 is a diagram illustrating an aircraft manufacturing and service method in which an advantageous embodiment may be implemented.
Figure 2:
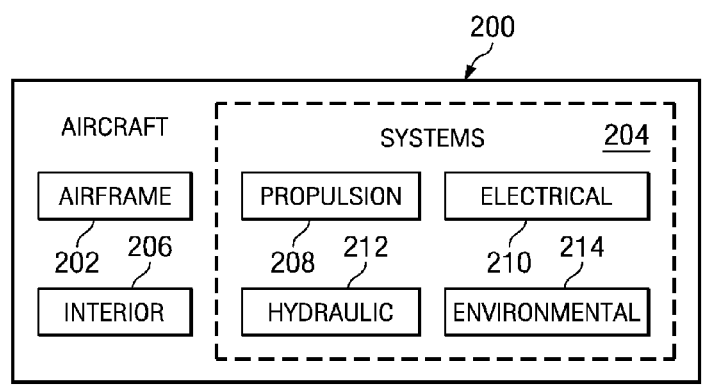
FIG. 2 is a diagram of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, by substantially expediting the assembly of or reducing the cost of aircraft 200. Similarly, one or more of apparatus embodiments, method embodiments, or a combination thereof may be utilized while aircraft 200 is in service 112 in FIG. 1, and/or in maintenance and service 114 in FIG. 1.

The different advantageous embodiments recognize that with composite structures, components may be co-joined to each other. Co-joining includes methods such as, for example, co-curing, co-bonding, or adhesive bonding. Co-curing and co-bonding involve securing or bonding components to each other. Co-curing, in particular, is accomplished by bonding together separate components in an assembly during the cure cycle of the composite materials. Co-bonding subjects two pre-cured components to a secondary cure cycle where bonding agents are introduced between the cured components. Adhesive bonding uses a room temperature adhesive coupled with pre-cured components, in these examples.

When composite components are co-joined using these or other methods, the composite components essentially become homogenous. In other words, loads may be transferred directly from one component to another component in a uniform manner. With this type of construction, the need for fasteners to couple one component to another is negated or eliminated.

In the case of commercial aircraft, however, passenger safety is paramount. Thus, redundancies in systems are demanded and used. Secondary or failsafe measures are employed in designing and manufacturing these types of products. With airframe joints, even though bonded components become homogenous and transfer all loads uniformly, additional components may be added to provide increased safety in the remote chance that a bond line or interface failure should occur.

The different advantageous embodiments recognize that shear loads are passed through a bonded joint in a composite structure. A shear load or shear stress is a load or stress that is parallel or tangential to the face of the material as opposed to a normal stress or load when the load is perpendicular to the face of the material. Shear pins may be used to provide additional safeguards or redundancy against this type of loading.

The advantageous embodiments provide a method and apparatus to mitigate or prevent the separation of bonded components should a failure occur in this type of bond. The different advantageous embodiments recognize that metal fasteners are conventionally used in joints. These types of fasteners, however, increase the weight of an aircraft. Further, the embodiments also recognize that the dissimilar materials, composite and metal, may create corrosion concerns requiring increased maintenance. Further, dissimilar coefficient of thermal expansion between different materials also may increase stresses within a structure.

Thus, the different advantageous embodiments recognize a need for unique composite components that can serve the function of failsafe shear pins as currently used in commercial aircraft. The different embodiments recognize that these types of components do not need to be used to fasten or join the composite structural components together. These types of components may be installed after a bonded homogenous assembly is complete.

The different embodiments also recognize that threads in the composites may be frail once subjected to torque. Thus, the different advantageous embodiments may use a composite shear pin that has an adhesively bonded component possessing a head opposite to the shear pin head to hold the composite pin in place. The different embodiments also recognize that this type of assembly reduces the possibility that the composite shear pin will disengage from the assembly.

Further, the different advantageous embodiments provide a method and apparatus for joining composite materials. A first composite component is co-joined to a second composite component. A channel is formed through the first composite component in the second composite component. A pin or other elongate member is passed through the channel. The orientation of the channel through the first and second composite components is designed or selected such that when a composite shear pin or other composite member is placed into the channel, additional support to redundancy against shear forces that may be applied to these two composite components is provided by the composite pin or composite member. A composite collar is co-joined to a portion of the composite pin to hold the composite pin in place within the channel.

In these examples, the composite collar is co-joined to the composite pin using an adhesive bonding process. In this manner, the composite pin and composite collar prevent the composite component from separating in the event that the bond created between the composite components fails. In other words, the composite pin and composite collar form a failsafe mechanism when joining composite components to each other.

Figure 3:
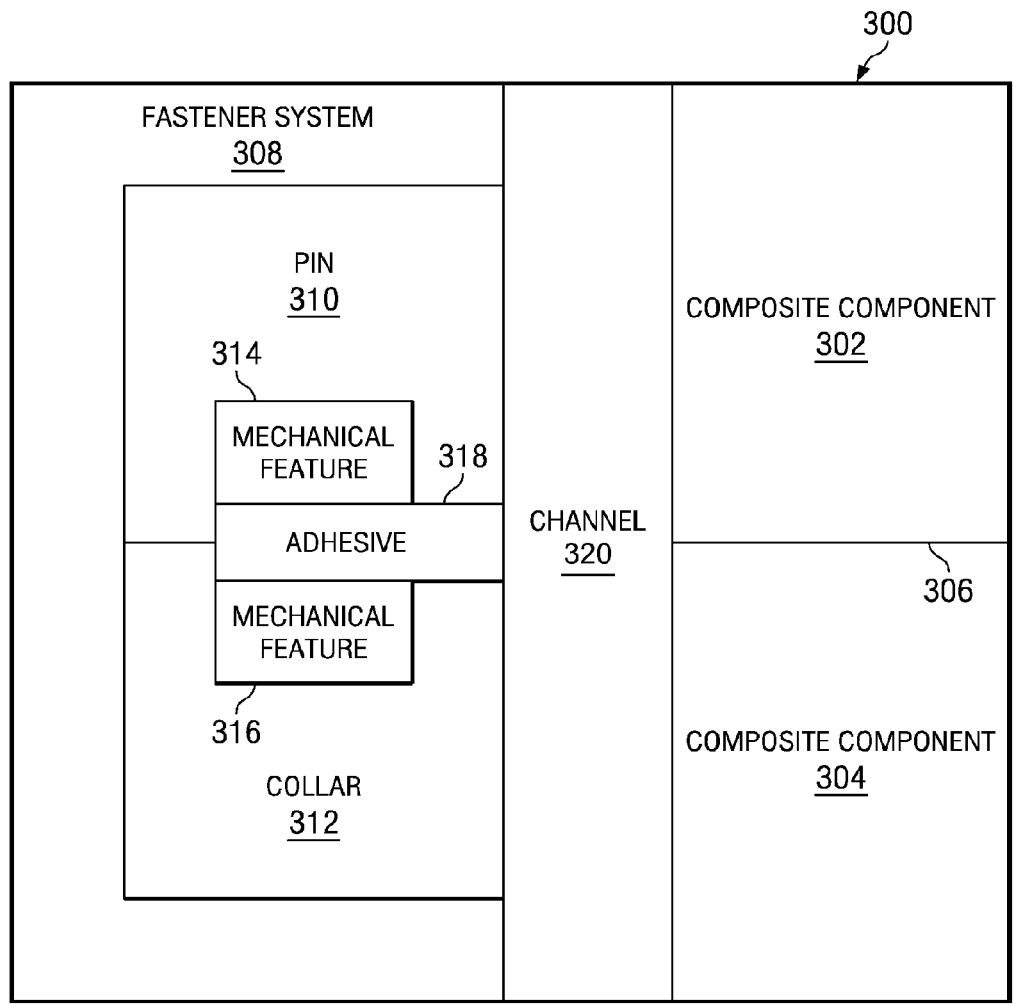
FIG. 3 is a block diagram illustrating functional components for joining composite components in accordance with an advantageous embodiment.

Turning now to FIG. 3, a block diagram illustrating functional components for joining composite components is depicted in accordance with an advantageous embodiment. In this example, structure 300 is an example a joint or structural joint that may be found in aircraft. Of course, structure 300 may represent other types of joints or structures in which two composite components are joined to each other. Composite component 302 and composite component 304 are co-joined to each other. In these examples, the co-joining may include, for example, without limitation, co-curing, co-bonding, or adhesive bonding.

In these examples, this co-joining occurs at interface 306 between composite component 302 and composite component 304. With this type of co-joining, composite component 302 and composite component 304 are essentially homogenous. Also, with this type of co-joining, loads may be transferred directly from composite component 302 to composite component 304 and vice versa. Normally, the need for fasteners is unnecessary because of this type of processing.

However, to increase safety and provide redundancies, fastener system 308 is employed in the different advantageous embodiments. All of the different components illustrated in these examples for joining or adding redundancies to two or more composite components are composite components, even if they are not specifically referred to as composite components. Fastener system 308 is a set of composite components that is used to mechanically join or fix two or more components to each other.

In these examples, fastener system 308 contains two or more components. Fastener system 308 includes pin 310 and collar 312. Pin 310 includes mechanical feature 314, while collar 312 includes mechanical feature 316. Fastener system 308 provides a redundancy or failsafe for the co-joining of composite component 302 to composite component 304.

In particular, fastener system 308 provides additional support or redundancy against shear forces that may be applied to composite component 302 and composite component 304. Fastener system 308 is employed after composite component 302 is co-joined with composite component 304, in these examples. Pin 310 is placed into channel 320, which extends through composite component 302 and composite component 304. Pin 310 may be placed into channel 320 without requiring any torque forces being applied to pin 310. Channel 320, may be formed by drilling a hole through composite component 302 and composite component 304. Pin 310 is held in place in channel 320, by collar 312.

Collar 312 is co-joined with pin 310 using adhesive 318. Collar 312 may be co-joined with pin 310 without requiring torque forces being applied to collar 312 or to pin 310. Adhesive 318 is applied between mechanical feature 314 and mechanical feature 316, in these examples. Further, adhesive 316 also may be applied within channel 320, prior to placing pin 310 into channel 320. In these examples, the adhesive may be, for example, without limitation, low temperature film adhesive such as Cytec FM300-2 which is available from Cytec Industries Inc. This type of adhesive may cure at room temperatures. In this manner, collar 312 prevents disengagement of pin 310 from channel 320.

Turning now to FIG. 4, a diagram illustrating a structure in which a fastener system may be implemented is depicted in accordance with an advantageous embodiment. In this example, fuselage 400 is shown in a quarter view for illustrating different advantageous embodiments. Fuselage 400 may form part of an airframe, such as airframe 202 for an aircraft, such as aircraft 200 in FIG. 2.

In this example, fuselage 400 is manufactured by joining different cylindrical sections together. In this example, section 402 and section 404 of fuselage 400 are illustrated as cut away views of cylindrical sections joined through structural joint 406. In these depicted examples, structural joint 406 is a junction where two components meet each other in which loads from one component may be passed to another component.

Turning now to FIG. 5, a cross-sectional view of a fuselage is depicted in accordance with an advantageous embodiment. A portion of section 402 and section 404, with structural joint 406, is depicted in this view of fuselage 400. In this example, section 402 and section 404 are joined to each other at structural joint 406. In this example, structural joint 406 is formed through the co-joining of different composite components to each other. Additionally, fasteners, such as fastener systems 500 and 502 are implemented to provide additional redundancy to the co-joined sections in structural joint 406.

Figure 6:
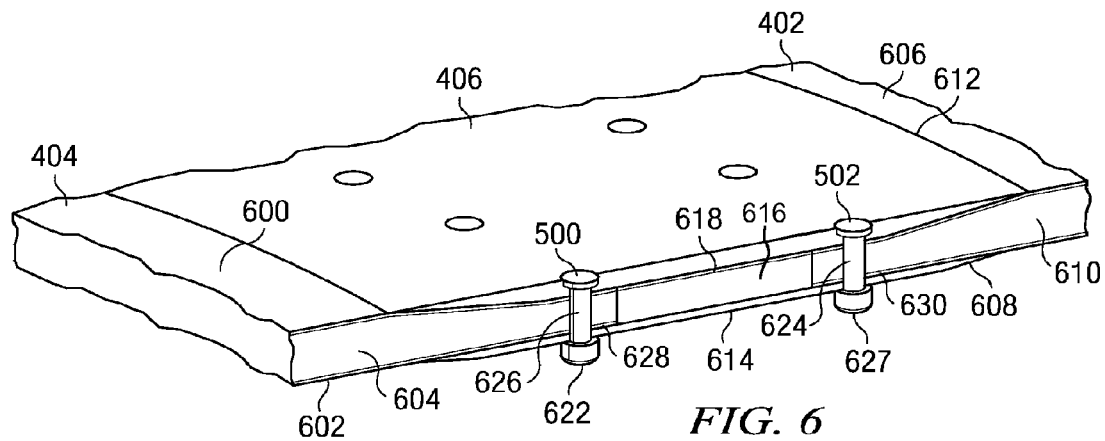
FIG. 6 is a more detailed illustration of a structural joint in accordance with an advantageous embodiment.

With reference now FIG. 6, a more detailed illustration of a structural joint is depicted in accordance with an advantageous embodiment. In this example, a cross-sectional view of structural joint 406 is depicted to illustrate structural joint 406 and its different components. In this example, section 404 takes the form of a honeycomb sandwich panel. Section 404 includes outer plate 600, inner plate 602, and core 604.

In these examples, outer plate 600 and inner plate 602 may be formed using BMS 8-276 carbon fiber epoxy prepreg. This material is available from Toray Industries, Inc. Core 604 is a honeycomb core and may be formed using N636 aramid paper coated with Phenolic resin. This type of aramid paper is available from Plascore, Inc. These materials are merely examples of materials that may be used in one embodiment.

The types of materials selected may vary in different embodiments and implementations. In a similar fashion, section 402 includes outer plate 606, inner plate 608, and core 610 located between these two plates. Structural joint 406, in this example, includes outer splice plate 612, inner splice plate 614, core 616, plate 618, and fasteners, such as fastener systems 500 and 502. Inner splice plate 614 and plate 618 act as covers for core 616, which is a honeycomb core, in these examples.

In these examples, fastener system 500 includes pin 626 and collar 622. Fastener system 502 includes pin 624 and collar 627. These pins are failsafe shear pins that are used to reinforce and/or provide redundancy within structural joint 406. Fastener system 500 is located within channel 628 while fastener system 502 is located within channel 630. The assembly of structural joint 406 comprises of two fuselage sections joined together with portions of inner plate 602, core 604, inner plate 608, and core 610 removed, creating a gap that is filled by the bonded-in-place splice assembly comprising inner splice plate 614, core 616, and plate 618.

Figure 7:
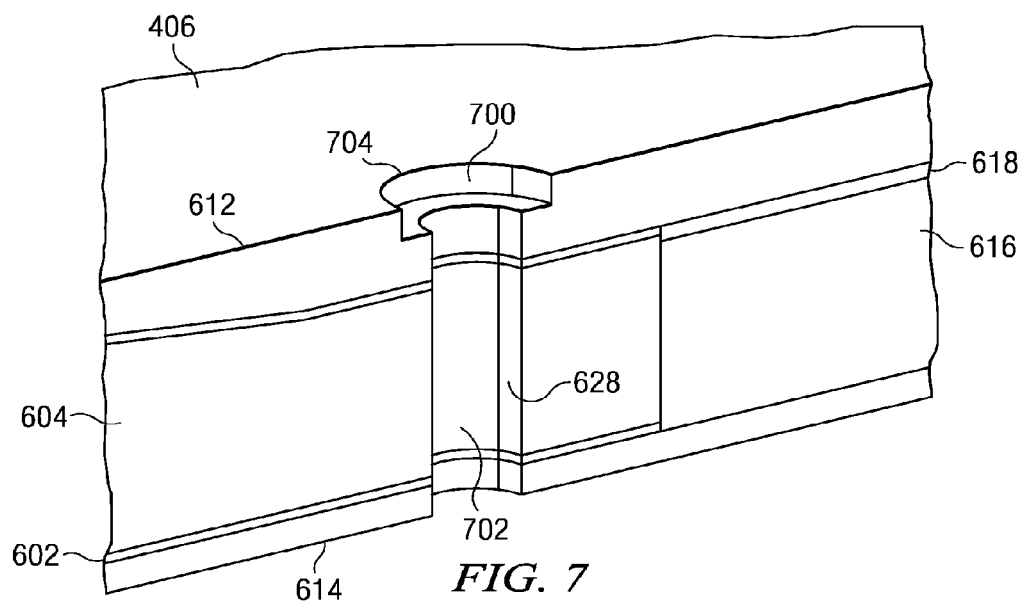
FIG. 7 is a diagram illustrating a channel in which a fastener is placed in accordance with an advantageous embodiment.

Turning now to FIG. 7, a diagram illustrating a channel in which a fastener is placed is depicted in accordance with an advantageous embodiment. In this example, a more detailed illustration of channel 628 is provided without fastener system 500. In this example, outer splice plate 612 is counter bored to form counter bored area 700 to receive the head 808 of pin 802 shown in FIG. 8.

Adhesive may be applied to internal surfaces, such as surface 702 within channel 628 and surface 704 in the counter bored area 700 of outer splice plate 612. The addition of the adhesive to these points prior to placing the fastener system into channel 628 provides for additional bonding of the fastener system to the joint. This application of adhesive may reduce the possibility that the fastener system becomes disengaged from channel 628. The application of adhesive also closes gaps solidly between channel 628 and pin 802 in FIG. 8 to assure full transfer of shear loads from the joint members into fastener system 500. Additionally, the application of adhesive seals air gaps creating an airtight enclosure for pressurizing the aircraft fuselage.

Figure 8:
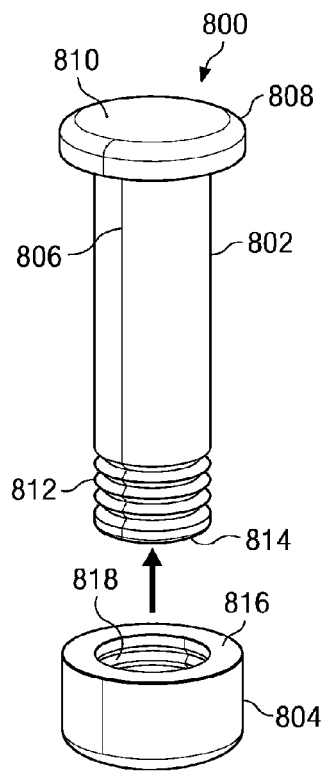
FIG. 8 is an illustration of a fastener in accordance with an advantageous embodiment.

Turning now to FIG. 8, an illustration of a fastener is depicted in accordance with an advantageous embodiment. In this example, fastener system 800 is an example of a fastener, such as fastener system 500 as illustrated in FIGS. 5 and 6. In this example, fastener system 800 includes pin 802 and collar 804. Pin 802 has elongate member 806 with head 808 at end 810. External annular grooves 812 are located at end 814. Elongate member 806 is also referred to as a shaft.

Collar 804 is a female collar, in this example, having channel 816 with internal annular grooves 818. Channel 816 is designed to receive external annular grooves 812 of pin 802. External annular grooves 812 and internal annular grooves 818 are examples of mechanical features. External annular grooves 812 and internal annular grooves 818 are configured to increase the retention of adhesive placed between these mechanical features.

When fastener system 800 is installed into a channel, head 808 prevents pin 802 from passing through the channel on one side while collar 804 prevents pin 802 from disengaging from the channel. Head 808 prevents pin 802 from sliding through the channel on the surface for which pin 802 is placed. The adhesive placed between external annular grooves 812 and internal annular grooves 818 may be cured at room temperature, in these examples. In these examples, pin 802 and collar 804 may be made from various composite materials. One non-limiting example is Cytec 977-3 carbon fiber prepreg which is available from Cytec Industries Inc.

Figure 9:
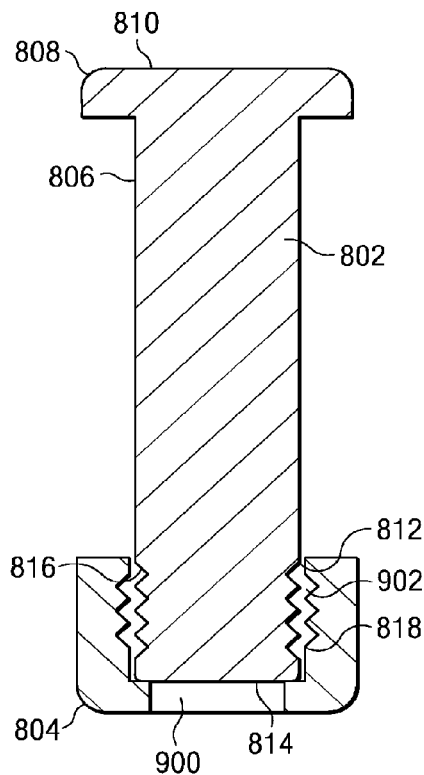
FIG. 9 is a cross-sectional view of a pin and collar in accordance with an advantageous embodiment.

With reference now to FIG. 9, a cross-sectional view of a pin and collar is depicted in accordance with an advantageous embodiment. Pin 802 and collar 804 illustrate external annular grooves 812 and internal annular grooves 818 in a cross-section. As can be seen, in this example, collar 804 has a diameter that is slightly oversized or is larger than the outer diameter of elongate member 806 in pin 802. This sizing provides hole 900, which provides a space for placing an adhesive. Hole 900 in collar 804 provides an exit for excess adhesive to be squeezed out of the cavity.

As can be seen, these annular grooves are non-threaded, in these examples. In other words, a threaded pitch is not present. These mechanical features are present to provide a mechanism to retain adhesives. The shape is not limited to the V shape grooves as illustrated in this example. Other shapes may be a U shape or serpentine shape.

Figure 10:
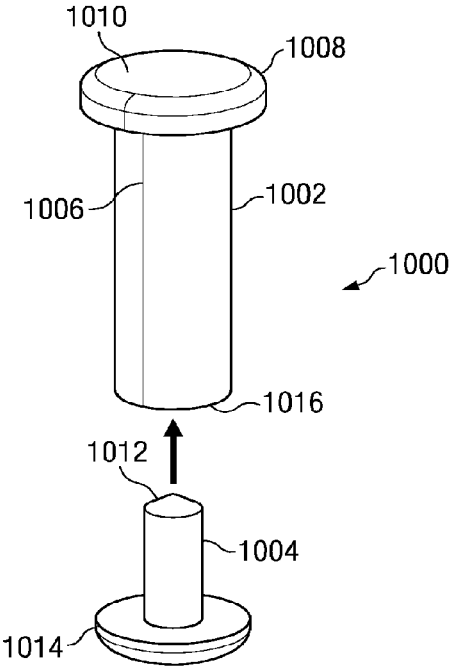
FIG. 10 is a diagram of a fastener in accordance with an advantageous embodiment.

With reference now to FIG. 10, a diagram of another embodiment of a fastener is depicted in accordance with an advantageous embodiment. In this example, fastener 1000 includes pin 1002 and collar 1004. Pin 1002 includes elongate member 1006 and head 1008 located at end 1010. Collar 1004 is a male collar, in this example. Collar 1004 includes elongate member 1012 and head 1014. Elongate member 1012 may be placed into a channel located at end 1016 of elongate member 1006. The channel is not visible from this view, but is depicted and describe below in FIG. 11. Adhesive may be used to bond pin 1002 to collar 1004. Collar 1004 is also referred to as a composite plug.

Figure 11:
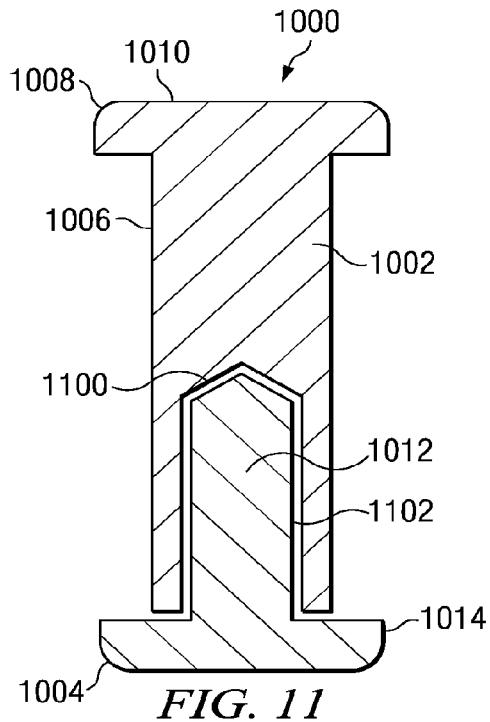
FIG. 11 is a cross-sectional view of a fastener system in accordance with an advantageous embodiment.

Turning now to FIG. 11, a cross-sectional view of a fastener system is depicted in accordance with an advantageous embodiment. As can be seen in this cross-sectional, view channel 1100 is present within elongate member 1006 of pin 1002. Additionally, elongate member 1012 and channel 1100 are the mechanical features used to hold or retain the adhesive, in this advantageous embodiment. In this example, adhesive is placed into space 1102 within channel 1100. The curing of the adhesive between these two mechanical features serves to co-join or bond pin 1002 to collar 1004, in these examples.

Figure 12:
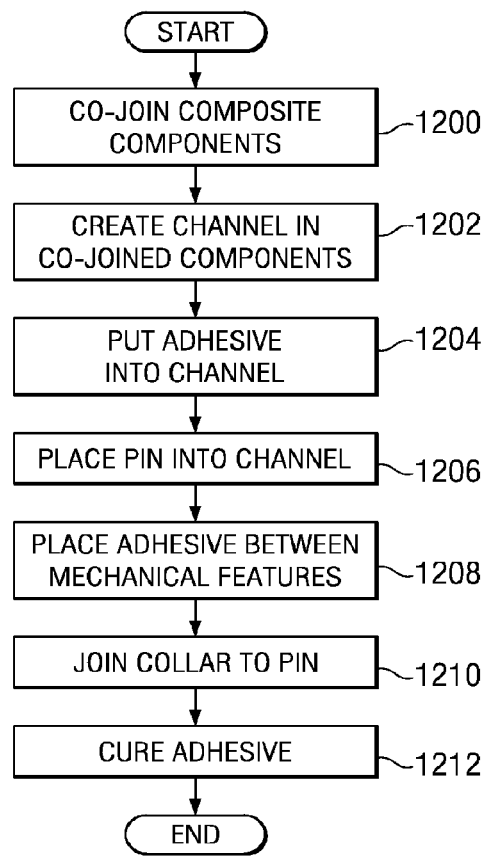
FIG. 12 is a flowchart of a process for joining composite components in accordance with an advantageous embodiment.

With reference now to FIG. 12, a flowchart of a process for joining composite components is depicted in accordance with an advantageous embodiment. The process illustrated in FIG. 12 may be implemented to join composite components to form various structures. In the illustrative examples, the composite components are joined to form a joint.

The process begins by co-joining composite components (operation 1200). The co-joining of composite components may be two or more composite components, which are joined to each other to form a structure, such as a joint. This joint may be a structural or non-structural joint, depending on the particular implementation.

Thereafter, a channel is created in the co-joined components (operation 1202). This channel may be created, in these examples, through a drilling operation. The channel is formed or designed such that additional redundancy or support is provided against forces that may be applied to the co-joined composite components when a fastening system is placed into the channel. In these examples, the type of force for which additional support or redundancy is provided is a shear force that may be applied to these composite components.

Next, the process places adhesive into the channel (operation 1204). This adhesive may help retain the fastener system within the channel. Operation 1204 is an optional step that may be omitted, depending on the particular implementation. Thereafter, a pin for the fastener is placed into the channel (operation 1206). Adhesive is placed between mechanical features for the pin and the collar (operation 1208). The collar is joined to the pin (operation 1210). The adhesive is cured (operation 1212), with the process terminating thereafter.

In operation 1202, the creating of the channel also may include forming a counter bore within the surface of one component where the head of the pin is to be placed. This prevents the head of the pin from extending above the surface of the composite component, in these examples.

Thus, the different advantageous embodiments provide a method and apparatus for joining composite component to each other. The first composite component is co-joined to a second composite component. A channel is formed through the first composite component and the second composite component. A composite fastener system is placed in the channel with an adhesive.

Although the illustrative examples show the forming of structures, such as structural joints, for an aircraft, the different advantageous embodiments may be applied to joining composite materials for other structures other than aircraft. For example, the different advantageous embodiments may be applied to join composite materials used in buildings, spacecraft, automobiles, trucks, submarines, and power plants.

The description of the different advantageous embodiments has been presented for purposes of illustration and description, and is not intended to be exhaustive or limited to the embodiments in the form disclosed. Many modifications and variations will be apparent to those of ordinary skill in the art. Although the mechanical features illustrated in these examples are features used to promote better co-joining or bonding between components in the fastening system, these mechanical features or additional mechanical features may be included to provide an ability to mechanically lock components to each other in the fastening system.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for bonding a structural joint for an aircraft, the method comprising:
   bonding a first composite component and a second composite component to form a bonded structural joint for the aircraft, such that the bonded structural joint comprises an outer splice plate, and an inner splice plate;
   creating a first channel through the first composite component-and a second channel through the second composite component, such that the first channel and the second channel, respectively, each pass through the outer splice plate and the inner splice plate;
   placing an adhesive on an interior surface of the first and the second channel respectively;
   thereafter, placing a first and a second composite shear pin into the first and the second channel, respectively, such that a head of the first and of the second shear pin, respectively, seats adjacent to the outer splice plate, and such that the first and the second shear pin each mitigate separation of the first and the second composite component due to shear forces; and
   bonding, using an adhesive bonding process, a first and a second composite collar to the first and the second composite shear pin, respectively, such that the first and the second composite collar are configured respectively, with a surface adjacent to the inner splice plate.

2. The method of claim 1, such that bonding the first composite component and the second composite component comprises:
   co-curing the first composite component to the second composite component.

3. The method of claim 1, such that bonding the first composite component and the second composite component comprises:
   co-bonding the first composite component to the second composite component.

4. The method of claim 1, such that the first and the second composite collar are each configured with a respective mechanical feature that retains adhesive.

5. The method of claim 4, wherein the mechanical feature is a set of non-threaded internal annular grooves.

6. The method of claim 1, wherein at least one composite collar is a male collar composite plug.

7. The method of claim 1, wherein the adhesive bonding process cures at a room temperature.

8. The method of claim 1, wherein placing the first and the second composite shear pin into the first and the second channel, respectively, occurs such that the adhesive closes gaps between the first and the second shear pin and the first and the second channel respectively.

9. The method of claim 1, wherein at least one composite shear pin is non-threaded, and positioning the at least one composite shear pin into at least one channel avoids torquing the shear pin.

10. A method for joining composite components, the method comprising:
    co-joining a first composite component and a second composite component to form a bonded structural joint, such that the bonded structural joint comprises an outer splice plate, and an inner splice plate;
    forming a first channel through the first composite component-and a second channel through the second composite component, such that the first and the second channel, respectively, each pass through the outer splice plate and the inner splice plate;
    placing an adhesive on an interior surface of the first and the second channel respectively;
    thereafter, positioning a first and a second composite shear pin in the first and the second channel respectively, such that a head of the first shear pin and a head of the second shear pin each seats adjacent to the outer splice plate, and such that the first and the second shear pin each mitigate separation of the first and the second composite component due to shear forces; and
    bonding a first and a second composite collar to the first and the second composite shear pin, respectively, such that the first and the second composite collar are configured respectively, with a flush surface adjacent to the inner splice plate.

11. The method of claim 10, wherein the step of bonding further comprises:
    applying adhesive in a space between the first and the second composite collar and the first and the second composite shear pin, respectively, to form an applied adhesive; and
    curing the applied adhesive.

12. The method of claim 10, wherein the first composite component and the second composite component are part of a structure selected from one of an aircraft, a submarine, a spacecraft, a power plant, a building, and an automobile.

13. The method of claim 10, wherein positioning the first and the second composite shear pin in the first and the second channel respectively, avoids torquing either composite shear pin.

14. The method of claim 10, wherein at least one composite collar is a male collar composite plug.

15. A joint comprising:
    a first composite component;
    an inner splice plate;
    a second composite component co-joined to the first composite component, such that an outer splice plate covers an outer portion of the first composite component and an outer portion of the second composite component, and wherein a first channel through the first composite component and a second channel through the second composite component are present and pass through the outer splice plate, and each channel being configured, respectively, with a counter bored area, being located at an end of the first and an end of the second channel respectively, nearest the outer splice plate;
    a first shear pin and a second shear pin, each respectively having a first end configured to prevent the first end from passing through the first and second channel respectively, and configured such that the first end, of the first shear pin and of the second shear pin, respectively, seats in the first and the second counter bored area respectively, and the first and the second shear pin each comprise a second end having a first mechanical feature configured to retain adhesive, such that the first and the second shear pin each mitigate separation of the first and the second composite component due to shear forces;
    a first and a second collar, each having a respective second mechanical feature configured to retain adhesive; and
    an adhesive located between the first mechanical feature and the second mechanical feature respectively, wherein the adhesive bonds the first and the second shear pin to the first and the second collar, respectively.

16. The joint of claim 15, wherein the second mechanical feature does not mechanically engage the first mechanical feature.

17. The joint of claim 15, wherein the joint is located in a structure selected from one of an aircraft, a submarine, a spacecraft, a power plant, a building, and an automobile.

18. The joint of claim 15 wherein at least one collar further comprises an opening that provides an exit for excess adhesive.

19. The joint of claim 15 wherein the pin and the collar comprise composite materials.

20. The joint of claim 15, wherein at least one collar is a male collar plug.

* * * * *